US012793494B2

(12) United States Patent
St. Martin et al.

(10) Patent No.: US 12,793,494 B2
(45) Date of Patent: Nov. 10, 2026

(54) METHOD AND SYSTEM FOR SECURING DOCUMENTS WITHIN A CONTAINER

(71) Applicant: Xerox Corporation, Norwalk, CT (US)

(72) Inventors: Kevin St. Martin, Rochester, NY (US); Timothy J. Kelley, Pittsford, NY (US); James M. Maryniak, Webster, NY (US); Gregory A. Ludgate, Williamson, NY (US); Patrick Darby, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/767,713

(22) Filed: Jul. 9, 2024

(65) Prior Publication Data

US 2026/0018006 A1 Jan. 15, 2026

(51) Int. Cl.

*G07C 13/02* (2006.01)
*H04N 1/12* (2006.01)
*H04N 1/32* (2006.01)

(52) U.S. Cl.

CPC ............. *G07C 13/02* (2013.01); *H04N 1/121* (2013.01); *H04N 1/32133* (2013.01)

(58) Field of Classification Search

CPC ........ G07C 13/02; G07C 13/00; H04N 1/121; H04N 1/32133; H04N 1/4466; H04N 2201/3205

See application file for complete search history.

(56) References Cited

U.S. PATENT DOCUMENTS 90,646 A 6/1869 Edison
387,572 A 8/1888 Wood
674,404 A 5/1901 Gierding
1,275,579 A 8/1918 McGowan
(Continued)

FOREIGN PATENT DOCUMENTS

CA 1226563 A * 9/1987 ............. G07C 13/02
CA 2626634 A1 * 4/2007 ......... B65H 31/3018
(Continued)

OTHER PUBLICATIONS

Xerox Corporation, "Fraud-Resistant Effects That Protect Your Most Sensitive Documents," Xerox Specialty Imaging, 8 pages (2019).

(Continued)

*Primary Examiner* — William L Miller
(74) *Attorney, Agent, or Firm* — Fox Rothschild LLP

(57) ABSTRACT

Methods and systems for securing a document within a container include providing a container which has multiple facets that are connected together to form a chamber. One of the facets of the container is a front facet with an opening that is sized with a width that equals or exceeds a width of each of a plurality of document sheets that will be received into the chamber via the opening. The opening is positioned at or below a top edge of the front facet and above a midpoint of the front facet. A print device will print the document sheets, each of which includes a unique identifier (ID). The print device will convey the document sheets into the chamber from the print device, without any human touching the document sheets, to form a stack of the document sheets within the chamber. The opening will be sealed with a sealing material.

21 Claims, 12 Drawing Sheets

(56) References Cited

U.S. PATENT DOCUMENTS

| | | | | | |
|---|---|---|---|---|---|
| 2,777,633 | A | | 1/1957 | Phillips | |
| 3,408,482 | A | * | 10/1968 | Busby | G06K 13/02 434/355 |
| 4,981,259 | A | | 1/1991 | Ahmann | |
| 5,364,217 | A | * | 11/1994 | Bath | H04N 1/4466 412/37 |
| 6,648,144 | B2 | | 11/2003 | Vogel | |
| 7,077,314 | B2 | * | 7/2006 | Johnson | G06Q 50/26 235/386 |
| 7,222,787 | B2 | * | 5/2007 | Cummings | G07C 13/00 235/386 |
| 7,395,956 | B1 | | 7/2008 | Bell et al. | |
| 7,635,087 | B1 | | 12/2009 | Chung et al. | |
| 8,038,053 | B2 | | 10/2011 | Kapsis | |
| 8,191,764 | B2 | * | 6/2012 | Bolton | G07C 13/00 235/375 |
| 8,225,998 | B2 | | 7/2012 | Bolton | |
| 8,413,880 | B2 | * | 4/2013 | Kapsis | G07C 13/02 235/54 C |
| 8,651,380 | B2 | * | 2/2014 | Baumert | G07C 9/23 235/386 |
| 8,733,646 | B2 | * | 5/2014 | Bolton | G07C 13/00 235/57 |
| 8,814,045 | B1 | * | 8/2014 | Brockhouse | G07C 13/00 235/386 |
| 9,864,906 | B2 | | 1/2018 | Eschbach et al. | |
| 9,916,401 | B2 | | 3/2018 | Eschbach et al. | |
| 9,916,402 | B2 | | 3/2018 | Eschbach et al. | |
| 9,961,230 | B2 | | 5/2018 | Eschbach et al. | |
| 10,176,658 | B2 | | 1/2019 | Eschbach et al. | |
| 10,237,442 | B2 | | 3/2019 | Chapman et al. | |
| 10,425,554 | B1 | | 9/2019 | Chapman | |
| 10,462,326 | B2 | | 10/2019 | Chapman | |
| 10,540,453 | B2 | | 1/2020 | Eschbach et al. | |
| 10,812,675 | B1 | | 10/2020 | Chapman | |
| 11,138,821 | B2 | | 10/2021 | Heuman | |
| 11,288,909 | B2 | * | 3/2022 | Lantz | G07C 13/02 |
| 11,776,344 | B1 | * | 10/2023 | Ogram | G07C 13/02 235/57 |
| 11,952,235 | B2 | * | 4/2024 | Hamabata | G03G 15/6582 |
| 12,488,647 | B1 | * | 12/2025 | Gruner | G07C 13/02 |
| 12,620,286 | B2 | * | 5/2026 | Bryl | G07C 13/02 |
| 2001/0050306 | A1 | | 12/2001 | Plumb | |
| 2002/0092908 | A1 | * | 7/2002 | Chumbley | G07C 13/00 235/386 |
| 2005/0247783 | A1 | * | 11/2005 | Poulos | G07C 13/00 235/386 |
| 2006/0041514 | A1 | | 2/2006 | Bogasky et al. | |
| 2006/0191426 | A1 | * | 8/2006 | Timmerman | B26F 1/38 101/24 |
| 2007/0164033 | A1 | * | 7/2007 | Maia | G07C 13/02 220/526 |
| 2008/0308634 | A1 | * | 12/2008 | Bolton | G07C 13/00 235/386 |
| 2009/0173778 | A1 | * | 7/2009 | Cummings | G07C 13/02 235/51 |
| 2009/0224030 | A1 | * | 9/2009 | Kapsis | G07C 13/02 235/51 |
| 2010/0006649 | A1 | * | 1/2010 | Bolton | G07C 13/02 235/386 |
| 2011/0017823 | A1 | * | 1/2011 | Baumert | G07C 13/00 235/386 |
| 2012/0031961 | A1 | * | 2/2012 | Kapsis | G07C 13/02 235/51 |
| 2012/0187188 | A1 | * | 7/2012 | Schmidt | G07C 13/02 235/386 |
| 2014/0231513 | A1 | * | 8/2014 | Brockhouse | G07C 13/00 235/386 |
| 2014/0263637 | A1 | * | 9/2014 | Roger | H04N 1/00371 235/386 |
| 2018/0018844 | A1 | | 1/2018 | Tinney et al. | |
| 2018/0165905 | A1 | * | 6/2018 | Keller | G06Q 90/00 |
| 2021/0114775 | A1 | * | 4/2021 | Tan | B65D 33/12 |
| 2025/0246038 | A1 | | 7/2025 | Smith | |
| 2025/0342740 | A1 | * | 11/2025 | Maguire | G07C 13/00 |
| 2026/0017001 | A1 | * | 1/2026 | St. Martin | G06F 3/1222 |
| 2026/0017472 | A1 | * | 1/2026 | Herrmann | G06K 1/121 |
| 2026/0018007 | A1 | * | 1/2026 | Bryl | G07C 13/02 |
| 2026/0019524 | A1 | * | 1/2026 | St. Martin | H04N 1/32133 |

FOREIGN PATENT DOCUMENTS

| | | | | | |
|---|---|---|---|---|---|
| JP | S59194973 | U | * | 12/1984 | |
| KR | 20240172794 | A | * | 12/2024 | B41J 15/04 |

OTHER PUBLICATIONS

"Voluntary Voting System Guidelines VVSG 2.0: Requirements for the Voluntary Voting System: Guidelines 2.0," Prepared for the Election Assistance Commission, 326 pages (Feb. 10, 2021).

* cited by examiner

METHOD AND SYSTEM FOR SECURING DOCUMENTS WITHIN A CONTAINER

BACKGROUND

In recent years, the need to ensure the security and integrity of certain documents such as voter ballots and test papers has become extremely important.

In the case of voter ballots, the sanctity of the democratic process hinges upon the assurance that each vote is accurately recorded and counted. If the security or integrity of ballots is questioned, it can call the legitimacy of an election into question and erode public trust in the democratic process.

In the case of test papers, educational institutions require accurate and untampered test papers to determine what score to give the student who completed the test. Similarly, licensing authorities such as driver's license and professional licensing agencies need to ensure the integrity of a completed test to determine whether to grant a license to an applicant.

Thus, safeguarding the security and integrity of documents like voter ballots and test papers is essential for preserving the trust, fairness and legitimacy of democratic processes, educational systems and licensing administrators, among other entities.

In recent years, questions about the integrity and fairness of election processes, educational institutions, and licensing systems have arisen. The spread of false information on the Internet, the rise of computer-based document alteration and generation technologies, and other forces have made it even more important to provide methods and systems that are designed to improve the integrity and security of election processes.

This document describes items, methods and systems that are designed to address the issues described above.

SUMMARY

In a first embodiment, methods and systems for securing a document within a container are disclosed. The method includes providing a container which has multiple facets that are connected together to form a chamber. One of the facets of the container is a front facet with an opening that is sized with a width that equals or exceeds a width of each of a plurality of document sheets that will be received into the chamber via the opening. The opening is positioned at or below a top edge of the front facet and above a midpoint of the front facet. A print device will print the document sheets, each of which includes a unique identifier (ID). The print device will convey the document sheets into the chamber from the print device, without any human touching the document sheets, to form a stack of the document sheets within the chamber. The opening will be sealed with a sealing material.

In a second embodiment, methods and systems for generating secure verification documents are disclosed. A processor that is associated with a multifunction print device will receive one or more source electronic document files, each of which includes content of one or more source documents, each associated with a unique content creator. The processor will cause a print engine of a multifunction device to print a plurality of verification document sheets, each of which comprises data from at least one of the source documents and includes a unique identifier (ID). After printing each verification document sheet, the processor will cause a scanner of the multifunction device to scan the verification document sheet to capture a digital image of the verification document sheet. The processor will then save the digital images of the verification document sheets to a data store.

BRIEF DESCRIPTION OF THE DRAWINGS

FIG. 10A is a perspective view of an alternate embodiment of a container, while

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such as "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" signifies values that are within +/−10 percent of a stated value.

When used in this document, terms such as "top" and "bottom," "upper" and "lower", or "front" and "rear," are not intended to have absolute orientations but are instead intended to describe relative positions of various components with respect to each other. For example, a first component may be a "front" or "top" component and a second component may be a "rear" or "bottom" component when a device of which the components are a part is oriented in a first direction. The relative orientations of the components may be reversed, or the components may be on the same plane, if the orientation of the structure that contains the components is changed. The claims are intended to include all orientations of a device containing such components.

Additional terms that are relevant to this disclosure will be defined at the end of this Detailed Description section.

Figure 1:
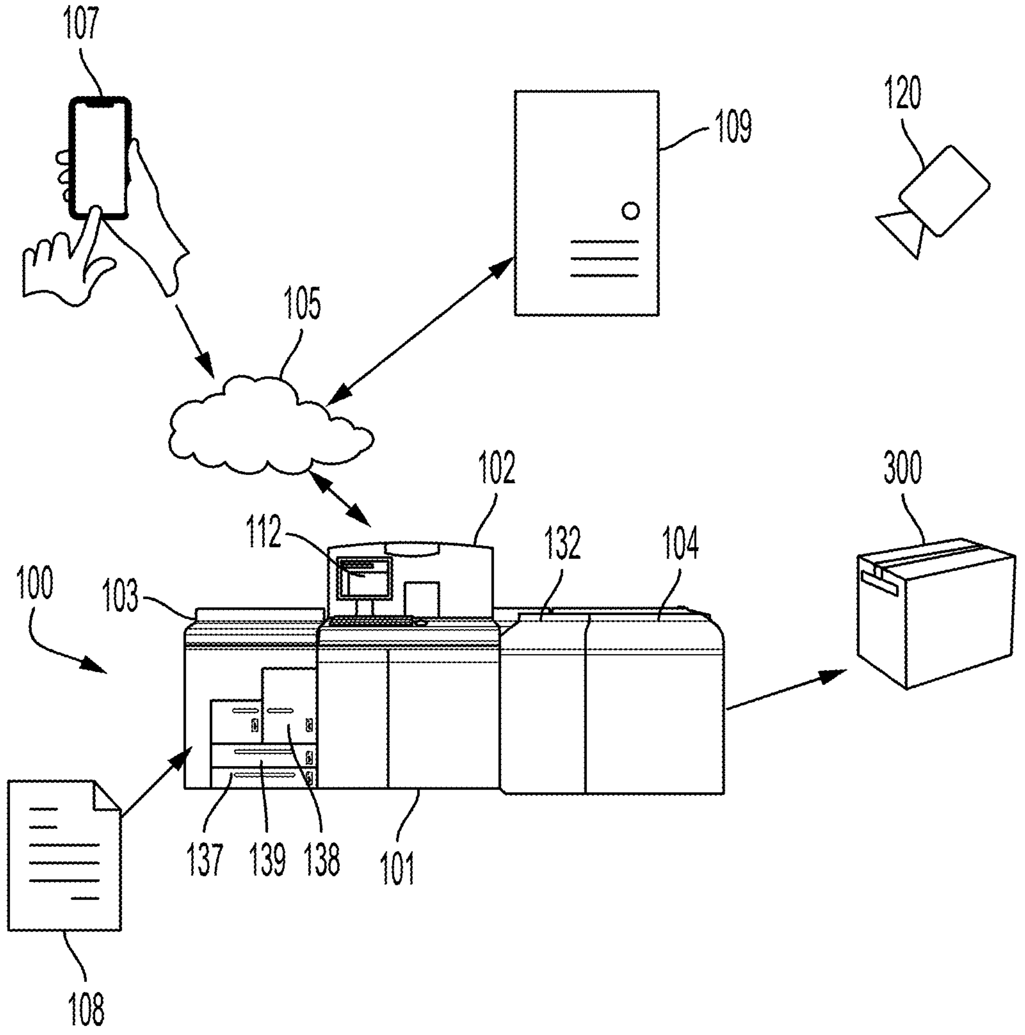
FIG. 1 illustrates elements of an example system that may be used to receive and/or generate documents and deliver the documents to a secure document collection and storage container.

FIG. 1 illustrates an example system that may be used to generate and direct documents to a secure document collection and storage container. The system includes a print device 101, which in this case includes printing and scanning modules and thus may be considered to be part of a multi-function device (MFD) 100.

The MFD 100 also includes or is operatively connected to a sheet supply module 103 that includes a container that holds a supply of substrates onto which content can be printed. For example, sheet supply module 103 may include a substrate supply tray 137 such as a feeder drawer or roller with paper or other substrate that can deliver documents to a print engine of the print device 101. Any number of additional substrate supply trays may be available to supply other substrates or materials. For example, a first substrate supply tray 137 may hold a supply of paper onto which validation documents are printed, a second substrate supply tray 138 may hold a supply of adhesive labels onto which markings for placement on the outside of a container may be printed, and a third substrate supply tray 139 may hold a supply of substrate exhibiting a color that is different from that of first substrate supply tray 137. Optionally, the various substrate supply trays 137 may hold substrates of different sizes, shapes, colors, and/or materials, or multiple supply trays may hold the same type of substrate. Substrate supply module 103 also may include a transport mechanism such as a document feeder, conveyor or rollers that can receive external documents (such as document 108) and direct the documents to a scanner of the MFD to be scanned.

The MFD 100 also includes a finishing module 104, which in this example includes a transport mechanism and a housing that is configured to hold a container 300 at a position where the opening 320 of the container 300 is adjacent to or receives the distal end of the transport mechanism. When container 300 is placed in this position, the transport mechanism may directly deliver documents printed by the print device 101 into the container without any human touching the documents between printing and delivery. When container 300 is filled, or when all documents that are to be delivered into a container 300 have been delivered, the container 300 may be removed from the housing, and the opening 320 of the container may be sealed. In other embodiments, the finishing module 104 may include a tray on which the documents are stacked, and a wrapping module that wraps or otherwise binds the stack of documents, such as with a plastic wrap, tamper-evident tape, string and/or wire, and/or other binding material.

The print device 101 and/or finishing module 104 also may include an additional processing module 132 that includes a scanner with a camera that is configured to capture images of received documents. In various embodiments, the scanner will be positioned in a document handling path of the MFD 100 so that the scanner can capture images of documents after the print engine of the print device 101 prints the documents. In some embodiments, the additional processing module 132 may include a cutting device with a blade that is configured to trim or otherwise cut documents printed by the print engine.

If multiple containers are used in stacked form (as discussed below in the context of FIG. 8), the finishing module 104 also may include a lift that is configured to move the stacked containers downward as they are filled, so that the lowermost container is filled first, then the next-lowest container, continuing until the uppermost container is filled.

MFD 100 also includes a computing device 102 which may include a processor, memory with programming instructions, memory for storage, and an optional user interface. The computing device 102 may be communicatively connected via a communication network 105 with external electronic devices such as a user electronic device 107 and/or external server 109. The communication network 105 may include one more wired communication networks, one or more wireless communication networks, or a combination of wired and wireless communication networks. The communication network may include a wireless network if the print device is not at the site where the document files are created.

Alternatively, to provide extra security the MFD 100 may be physically located at the facility where the document files are created, such as at a polling place, and communicatively isolated from external communication networks such as the Internet. In such situations, the only communication connection between the MFD and external devices may be a direct wired or wireless connection to the machines that are used to receive ballots cast by voters. Such machines may be voter kiosks into which voters cast their votes, or they may be vote scanning machines that read physical ballot documents onto which voters printed their votes. The direct connection may be one or more physical communication wires, and/or a direct JSON or socket connection, using encryption algorithms such as those approved by National Institute of Standards and Technology (NIST) with at least 112-bit encryption and/or methods having Federal Information Processing Standards (FIPS) 140 certification.

In some embodiments, the MFD may be housed on a vehicle and transported to polling places where the MFD's operations are needed. If the MFD is housed in a vehicle, it may include features and functions such as those described in U.S. Pat. No. 11,599,312, the disclosure of which is fully incorporated into this document by reference. Alternatively, if the MFD 100 is connected to an external communication network, a firewall and/or other security measures will be implemented in the communication path between the MFD 100 and the external network.

The computing device 102 may receive source document files from the user electronic device 107 and use the files to print verification document sheets containing content from the source files, as will be described below in the discussions of FIG. 12. The user electronic device 107 may be an individual's personal computing device, or it may be a kiosk that is programmed for a specific function, such as a voting machine. The computing device 102 may send electronic records that the computing device 102 generates to the external server 109 for storage.

Optionally, MFD 100 also includes a document scanner, such as a scanner in additional processing module 132, that is positioned to receive document sheets that the print engine prints and capture an electronic image of each document. The system will save each scanned image to a data store and optionally use the images as described below.

Optionally, the system may include a camera 120 such as a video camera that is positioned to have a field of view that includes the print engine 101, additional processing module 132 and finishing module 104 so that the camera can record a video of the printing, directing and sealing steps and save the video to a digital video file.

The MFD 100 may be secured such that it requires an operator to present a security credential such as a token, enter a username and passcode, permit this system to take a photo or other action for biometric recognition, and/or take some other security measure before the system will operate to perform the functions described below. In addition, once the system accepts an operator credential, it may display information about the event for which it will operate, such as election name, district, county, and/or polling location.

Figure 2:
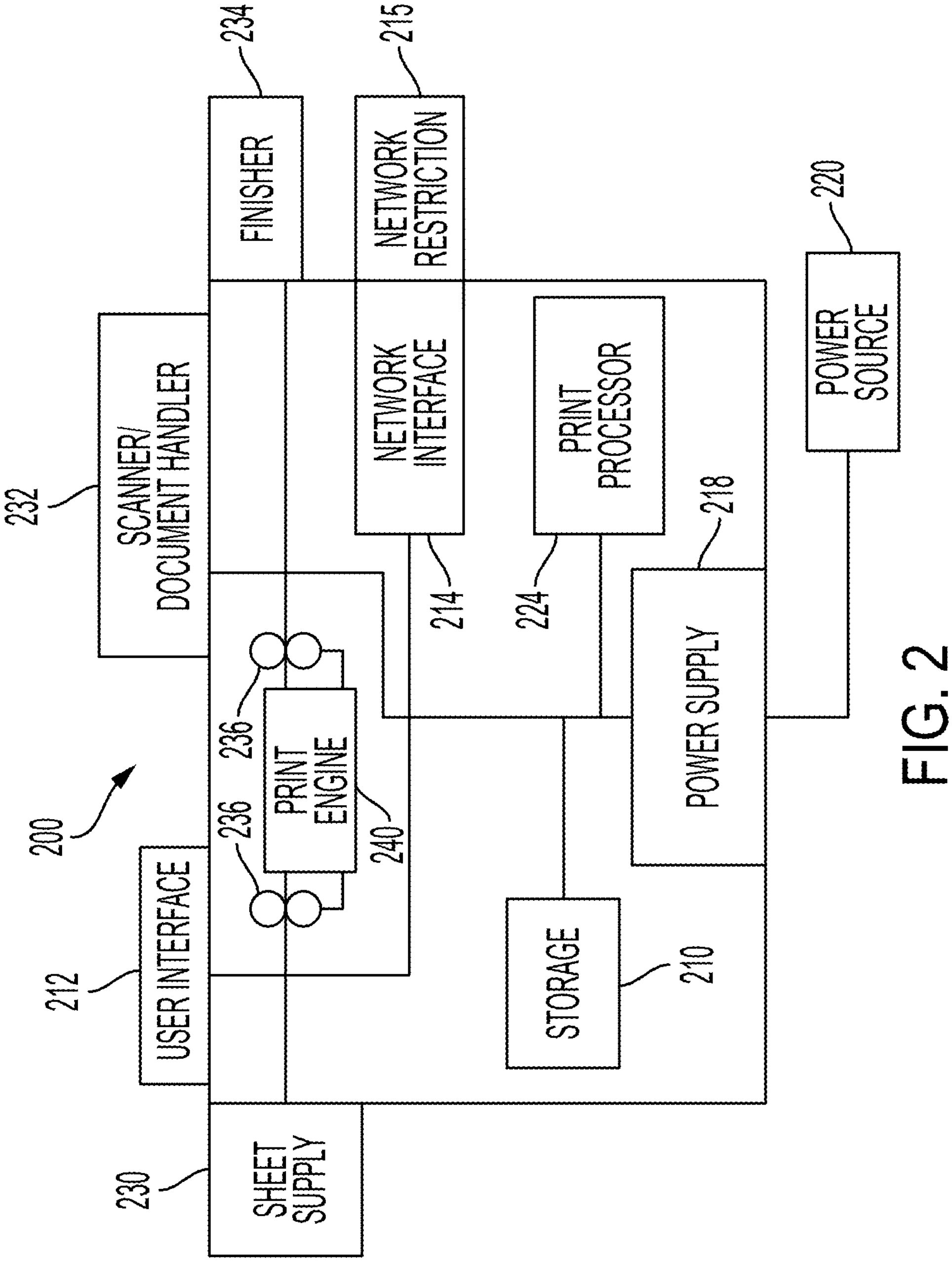
FIG. 2 illustrates components of an example multifunction device that may be used with the system.

FIG. 2 illustrates components of an example MFD 200, which may serve as the MFD 100 of FIG. 1. MFD 200 may also be embodied as, or incorporated in, a printer, copier, multi-function machine, or other device that includes the capability to print, scan, and/or copy a document, including an electronic document, on a physical printable and/or readable media, such as paper. MFD 200 includes a print engine 240 capable of printing markings on sheets of print media, a processor 224 operatively coupled to the printing engine 240, a user interface 212 operatively coupled to the processor 224, and a network interface 214 operatively coupled to the processor 224 and print engine 240. Storage 210 is a data store that is also operatively coupled to network interface 214, processor 224, and print engine 240. Print engine 240 is also operatively coupled to sheet supply 230, scanner/document handler 232, media path 236, and optionally a finisher 234. Power supply 218 receives input from a power source 220 such as an external power outlet or a battery and provides power to components in MFD 200 including storage 210, network interface 214, processor 224, and print engine 240. Other elements may be included in MFD 200 but are not described here in the interest of conciseness.

In operation, processor 224 may receive an electronic document file and a request to print the document sheets on a substrate via the network interface 214. As noted above in the discussion of FIG. 1, the network interface 214 may include network restriction elements 215 such as those that only allow a hard-wired connection, and no wireless connection, in accordance with various standards. In addition or alternatively, the network restriction elements 215 may include a visual indicator such as a light or displayed symbol indicating that the system is connected—or confirming that the system is not connected—to any external network. Optionally, the system may include network restriction elements 215 may include an actuator that can be used to disconnect the system from external wireless networks, to disable any wireless communication elements in the system, and/or to actuate a signal that is configured to interfere with any wireless communication equipment that may be operative within the system.

In some embodiments, processor 224 or certain elements of it may be referred to as an image processor and may operate in a different manner than a general purpose processor if it is specialized for processing image data. A printing mechanism is initiated by instructions in signals communicated from processor 224 to print engine 240. Media path 236 is positioned to supply continuous media or sheets of a print media substrate (e.g., paper or cardstock) from sheet supply 230 to the marking device(s) included in print engine 240. After print engine 240 generates and applies various markings to sheets of substrate, the sheets may optionally pass to finisher 234 which can flip, fold, staple, sort, collate, cut, etc., the various printed sheets based on the additional information associated with printing the electronic document. Finisher 234 may be part of the finishing module 104 of FIG. 1. In the embodiments of this disclosure, finisher 234 may include a conveyor that directly conveys the printed substrates into the secure storage container. In addition or alternatively, finisher 234 may include an output tray from which a human or a mechanical operator can lift the documents and move them to the container and/or bind the documents with a binding material.

MFD 200 also includes scanner 232 that includes a camera and a document handler with transport components (such as a conveyor or rollers) that will pass a document under the camera so that the camera may capture an image of the document. The scanner 232 may receive and capture a digital image of each document sheet printed by the print engine 240 so that the system can create an electronic record of each document sheet that the print engine 240 prints. If the system receives a physical document from an external source, scanner 232 also (or instead) may scan the document before printing a copy of the document.

Optionally, MFD 200 may include a user interface 212 that is configured to display one or more menus that may include selectable options and/or status reports for the print jobs to be printed. User interface 212 may receive instructions for displaying the menus from processor 224 and may further provide entry information to processor 224. The menus may include an option, selectable by the user, to create an electronic record associated with the printed and/or scanned document sheets. The electronic record is created by processor 224. The electronic record may include an identification for each of the verification sheets that enter a particular container. The electronic record may additionally include one or more informational elements, such as a table of contents, a stack ID or a container ID, a date and/or time range during which the documents were printed, or other items. The electronic record may be one or more electronic files that are stored in the storage 210 and/or transmitted to an external storage (such as a memory of external server 109 of FIG. 1) via network interface 214. Optionally, the storage 210 may be a removable storage medium such as a removable hard drive, a USB drive, or another removable storage device that can be disconnected from the MFD and moved to a secure location.

Figure 3:
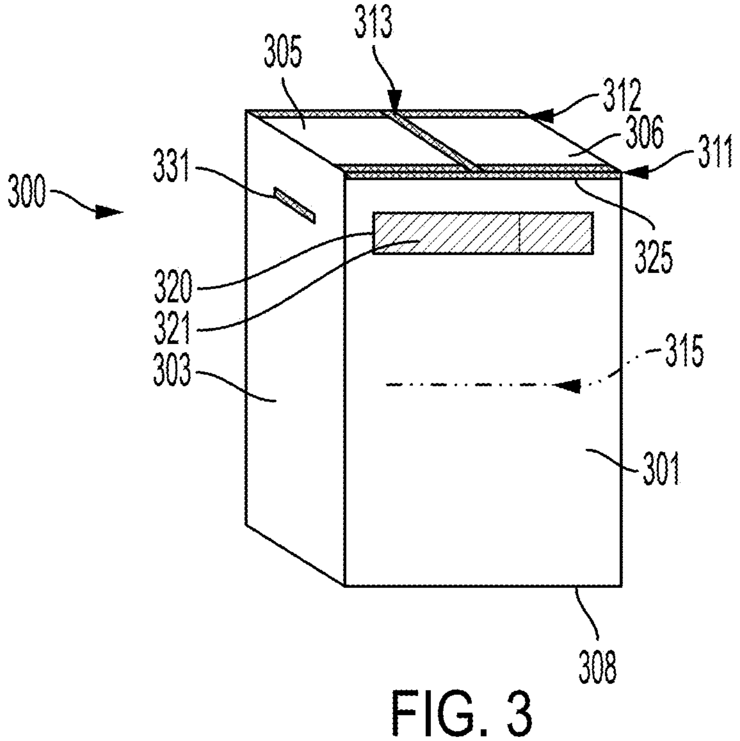
FIG. 3 illustrates a perspective view from a front side of a secure document collection and storage container.
Figure 4:
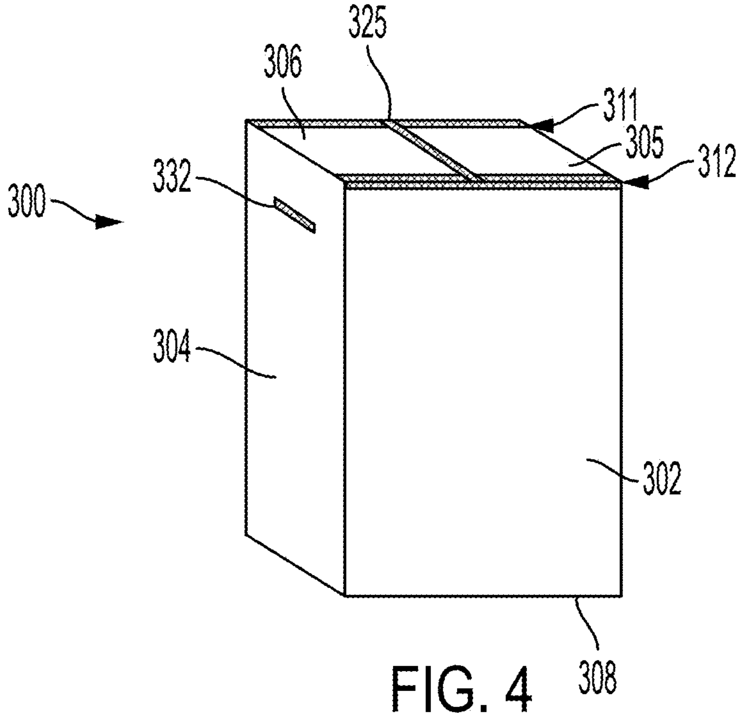
FIG. 4 illustrates a perspective view from a rear side of the secure document collection and storage container of FIG. 3.
Figure 5:
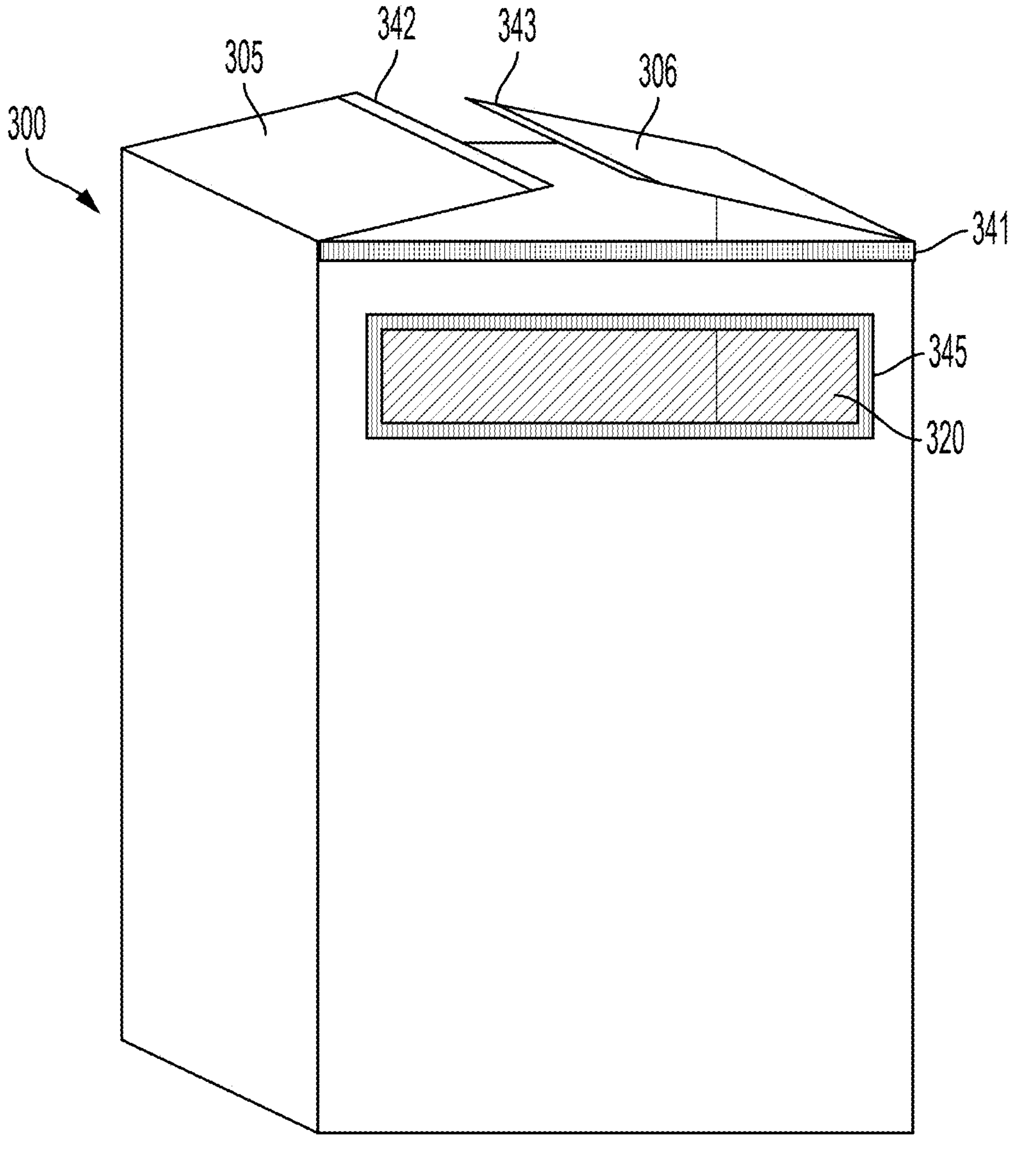
FIG. 5 illustrates the container of FIGS. 3-4 with its top opened and guide markings for sealing material placed in certain positions.
Figure 6:
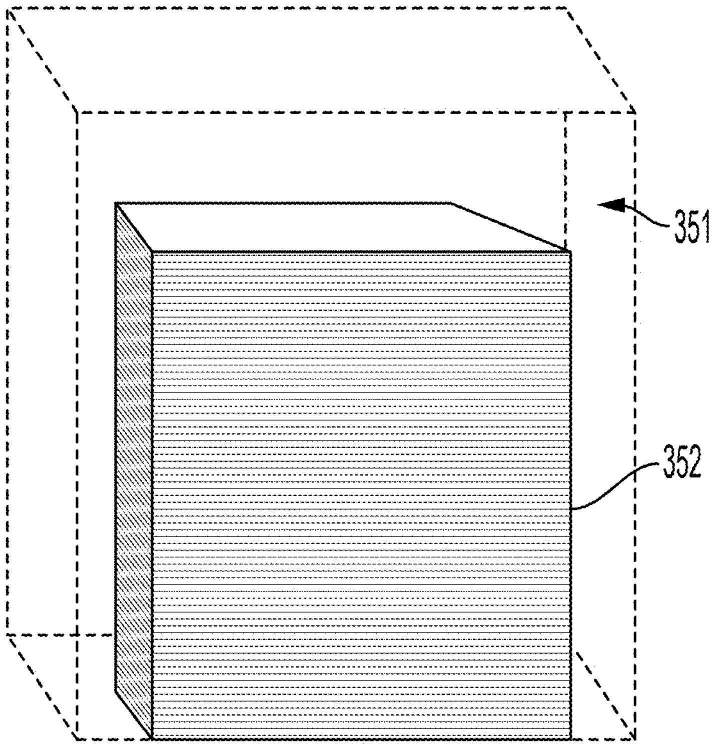
FIG. 6 illustrates a cut-away view of the container of FIG. 3, showing an interior chamber of the container with a stack of documents inside of it.

Various embodiments disclosed in this document use and/or include a secure document collection and storage container. The container can be used to secure documents for which the integrity needs to be maintained and secured, such as documents evidencing completed ballots or test answers. FIGS. 3-5 illustrate an example of one embodiment of such a container 300. In this case, the container 300 is in the form of a box having a first pair of opposing side facets 301 and 302 and a second pair of opposing side facets 303 and 304 that collectively form four sides of the box. The container 300 also includes a top facet comprising at least two facet segments 305 and 306. The container 300 also includes a bottom facet 308, which may be formed as a single facet or as multiple facet segments.

An opening 320 is formed in one of the side facets 301, For purposes of explanation, this discussion may refer to the side facet 301 that includes the opening 320 as the "front" side of the container, the opposite facet 302 as the "rear" site of the container, the top facet 305/306 as the "top" of the container, and the bottom facet 308 as the "bottom" of the container.

The top facet includes at least two facet segments 305 and 306, which in this illustration may be folded up and away from each other as shown in FIG. 5. Each top facet segment 305, 306 is rectangular and includes one edge that is foldably connected to a side facet 303, 304. In other words, each top facet segment 305, 306 connects to and is integral with a top edge of a side facet 303, 304 along a fold line. The other three edges of each top facet segment 305, 306 are not integral with the side facets 301, 302 but may be folded into a closed position and attached to the side facets 301, 302 by tape or other connecting material to form seams 311, 312 as described below. While the Figures show integration and fold lines as being between top facet segments 305, 306 and side facets 303, 304 by way of example, in other embodiments the integration and fold lines for top facet segments 305, 306 could instead be with front and rear side facets 301, 302, respectively.

An opening 320 is formed at or below the top edge of the front facet 301. The top edge of the front facet 301 is the location of the seam 311 between the front facet 301 and the top facet 305, 306 in the configuration shown. However, in embodiments where the front facet 301 is foldably connected to a top facet segment, the top edge of the front facet 301 will be the fold line between the front facet 301 and its integral top facet segment.

The opening 320 is also above the midpoint 115 of the front facet 301 so that the opening can receive documents into the container's interior chamber 351. The opening has a width that is at least as wide as the width of the document to be collected in the container, such as the width of a ballot or a test answer sheet. By positioning the opening 320 above the midpoint 315, a stack of documents can fill at least half of the chamber before the opening 320 will be blocked by the documents. Thus, it may be desirable to position the bottom boundary of the opening 320 closer to the top edge of the front facet 301 than to the midpoint 315. For example, the bottom boundary of the opening 320 may be located at a position away from the bottom facet 308 that is least 70%, at least 75%, at least 80%, or at least 85% of the height of the container 300. In this way, as shown in the cut-away view of FIG. 4, documents may be placed inside the container's chamber 351 to form a stack 352 that reaches more than half, and in some cases even more, of the height of the chamber.

The opening 320 is sufficiently sized to receive a document without a requirement to fold or otherwise modify the document, but the opening may be smaller than a typical adult human's hand and arm to prevent adults from reaching into the opening and removing documents from the chamber. For example, if the document is an 8½ inch by 11 inch sheet of paper, the opening 320 may have (a) a width that is between approximately 8⅝ inches and approximately 10 inches wide, such as a width that is approximately 9 to 9½ inches, and (b) a length that is between approximately 11⅛ inches and approximately 12½ inches, such as a length that is approximately 11½ to 12 inches. The opening 320 may have a height that is between approximately 1 inch and approximately 3 inches, such as a height of approximately 2 inches.

Figure 7:
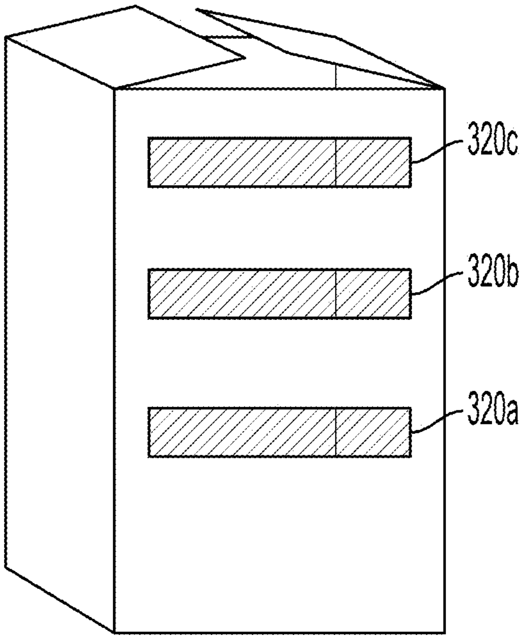
FIG. 7 illustrates an embodiment of a container in which the front facet includes multiple openings.
Figure 8:
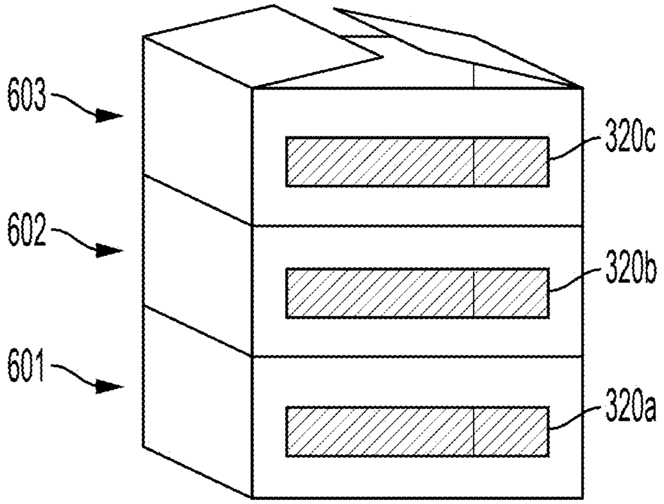
FIG. 8 illustrates an embodiment in which multiple containers are stacked on top of each other.

In the embodiment shown in FIGS. 3-5, container only has a single opening 320 for receiving documents, located on the front facet 301. However, optionally the rear facet 302 and/or one or more of the other side facets 303, 304, also may have a similarly-structured opening. In addition, in some embodiments as shown in FIG. 7, the front facet may include multiple openings 320*a*-320*c*, positioned at various heights. If so, then when filled documents will first be placed into first (lowest) opening 320*a* until the stack of documents in the container reach a height that is at or just below the bottom edge of first opening 320*a*. Documents will then be placed into the next-lowest opening 320*b*, and the process will continue until the highest opening (320*c*) is used. In addition, as illustrated in FIG. 8, in some embodiments a set of smaller, stacked containers 601-603 may collectively each include a respective front facet opening 320*a*, 320*b*, 320*c*. When a first container 320*a* is filled, a second container 320*b* may be placed on top of it and filled, followed by a third container 320*c*, and any number of additional containers.

The dimensions of each container 300 will include a length and width that are each slightly greater than the length and width of the documents that will be received into the chamber 351. For example, the length and/or width of the container may be any number in the range of from about 1% to about 25% greater than the corresponding width of the documents.

Figure 9A:
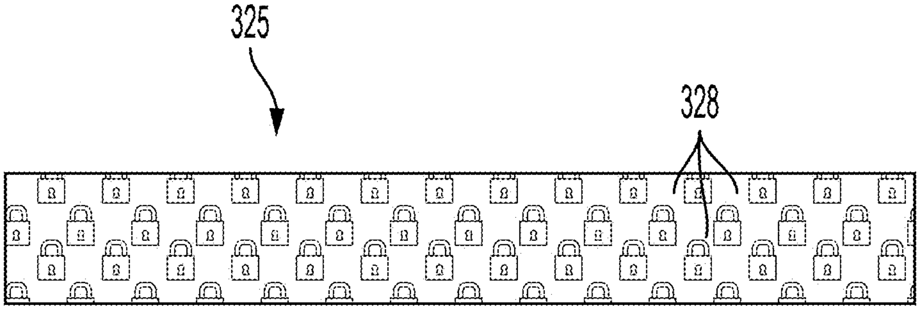
FIG. 9A illustrates an example security mark that may be printed onto the container, onto tamper-evident tape, or both.

Either before or after documents are received into the container, the top seams 311, 312, the seam 313 between the top facet segments 305, 306, and all other seams of the container 300 will be sealed shut with a sealing material 325. The sealing material 325 will also cover each opening 320 that is used to introduce documents into the container. Optionally, the sealing 325 may be in the form of tamper-evident tape. Tamper-evident tape is a type of security tape that cannot be removed or reapplied without leaving physical evidence, such as a visible message on the substrate of the container under the tape, or a visible change in security marks that are printed on or embedded in the tape. FIG. 9A illustrates an example strip of tamper-evident tape 325 with security marks 328. Any now or hereafter known tamper-evident tape materials may be used.

Figure 9B:
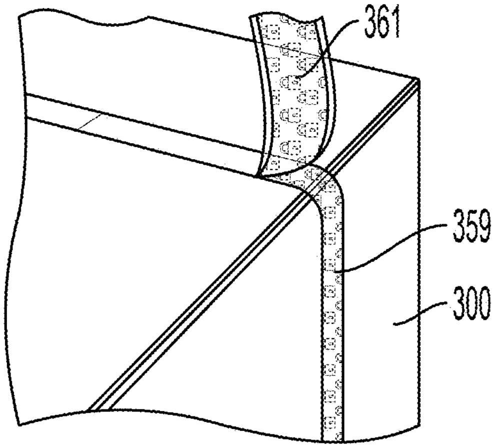
FIGS. 9B and 9C illustrate examples of tamper-evident tape that includes security marks.

For example, in some optional embodiments, as illustrated in FIG. 9B, the tamper-evident tape may be of the hidden message type in which the security marks are printed on a bottom adhesive layer 359 that adheres to the container 300. An opaque, removable covering layer 361 covers the adhesive layer 359 and shields the security marks from view unless and until the covering layer 361 is removed from the adhesive layer 359.

Figure 9C:
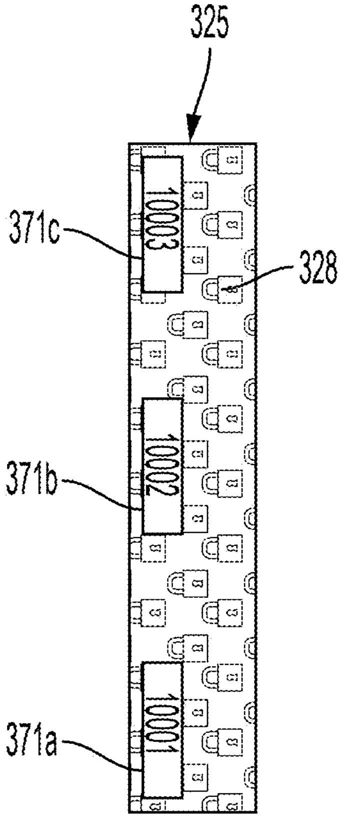

In addition, or alternatively, as illustrated in FIG. 9C, in some embodiments the security marks 328 are printed on a sealing material 325 that is tamper-evident tape. the tape may also (or alternatively) include additional security marks in the form of a sequence of unique serial numbers or other serialized codes 371*a* . . . 371*c*, printed on the tape at various intervals. If such tape is used, the tape applied to the container at the time the contents are secured will contain an uninterrupted sequence of codes. If, at a later time, it is determined that the codes printed on the tape do not follow an uninterrupted sequence, one may conclude that the original tape was removed and new tape was applied, thus providing evidence of tampering. For example, if an out-of-sequence code appears on the tape, or if a code of the sequence is missing from the tape, one may conclude that the container was compromised. The sequence may be a numeric sequence as shown in FIG. 9C. Alternatively, the sequence may be a sequence that is stored in a data set or other key as an ordered sequence, but which is appears to be random or is otherwise not in a typical numeric sequence when viewed by a human or optical reader that does not have access to the key.

In addition, as shown in FIG. 5 in which the top facets of the container are open and the container is not yet sealed closed, in some embodiments, security tape guide markings 341, 342, 343 may be printed on one or more of the facet edges of the container on the areas on which under the tamper-evident tape 325 will be placed. The security tape guide markings 341, 342, 343 will be positioned and have a width that matches (or is within 90% of) the width of the tape so that the tape completely covers the guide markings when the tape is correctly applied to the container. The security tape guide markings 341, 342, 343 may be positioned on the edges of facets that meet other edges to form the seams as shown. In addition, security tape guide markings 145 may be positioned around the border of other openings of the container (such as opening 320) to guide the placement of security tape, an adhesive label, or other marking around the other openings. The guide markings are marks printed on the facet with a pattern or color that is visibly distinct from the facet to serve as a base for receiving of the security tape. The guide markings may be in the form of a dot pattern, a line pattern, a color that is different from the color of the container, a pattern of icons or other images, and/or a combination of these and other markings. The guide markings are marks printed on the facet with a pattern or color that is visibly distinct from the facet to serve as a base for receiving of the security tape. The guide markings will have a border size and shape corresponding to that of the security tape such that when the tape is placed over the security marking, the tape will completely cover the full security marking, or the tape will completely cover all but a designated area of the security marking.

In some embodiments, none of the facets other than the front facet 301 include any opening when the seams are closed and covered by a sealing material. In other embodiments, as shown in FIGS. 1 and 2, optional handles 331, 332 may be provided on opposing sides of the container. Handles 331, 332 will be openings that are sized to receive the fingertips of a human hand or the grip of a lifting device (such as robotic picker) and allow the human or a lifting device to lift and move the container. By way of example, handles 331, 332 may have a size of approximately 1 inch to approximately 2 inches high, and approximately 4 inches to approximately 5 inches wide. In FIGS. 3 and 4, handles 331, 332 are shown on the facets of the container that are not the front and back sides. However, in other embodiments, handles 331, 332 may be positioned on the front and back facets 301, 302. Optionally, when handles 331, 332 are positioned on the front and back facets 301, 302, a single opening 320 may serve the dual function of the handle and the document receiving slot. In other embodiments, the container may not include any handles.

In use, after documents have been placed into the box through the opening 320, the opening 320 and any other openings that are large enough to receive a human hand (such as handles 331, 332, if large enough to receive a full adult human hand) will be covered and sealed by a sealing material 321. Alternatively, handles 331, 332 may remain unsealed if they are sufficiently small to not allow a human or device to reach into the chamber and remove documents from, add documents to, or otherwise tamper with documents in the chamber. For example, any opening having a width dimension (in any direction) that is greater than 1 inch, 1.5 inches or 2 inches, or that is greater than 2.5 cm, 3 cm, 4 cm, or 5 cm may be covered by the sealing material.

The sealing material 321 that is used to seal the openings may be tamper-evident tape (such as that described above for sealing material 325) or any other type of tape or material that seals the opening and prevents access to the chamber. Alternatively, or in addition, the sealing material 321 may include a label with some unique identifying item with can used to identify the box and its contents, such as an adhesive label that has an attached or embedded a radio frequency identification (RFID) tag having a unique identifier, a label on which a human readable element (such as a barcode) is printed, or another identifier. The label may include an adhesive backing, or the label may be attached to a structure that includes an adhesive backing, such as a clear plastic sleeve. Alternatively or in addition, an RFID tag or human readable element may be included in or on a separate adhesive label that is attached to any facet of the container. Alternatively or in addition, an RFID tag may be directly embedded in a facet of the container, and/or a human readable element may be directly printed on a facet of the container. The identifier in the tag or label may be a unique code. Items that include RFID tags, such as customer replaceable units (CRUs) as are known to be used in print devices, may be employed in some embodiments, so long as the CRUs or their associated RFID chips include a unique identifier that cannot be modified when deployed.

Optionally, a system that uses the container may store the code in a data set in association with information about the container or its contents, such as the container's location, document IDs for documents in the chamber, a description of the contents of documents in the chamber, or images of the documents that are in the chamber. Alternatively or in addition, the sealing material 321 may be a covering that envelops the entire container, such as a plastic cling wrap or shrink wrap material.

The facets of the container 300 may be made of any material that is sturdy enough to hold the documents without breaking. Example materials include cardboard, plastic, wood or other fibrous material, and metal. In some embodiments, the container may be made of multiple different types of materials. If a very rigid material such as wood or metal is used, hinges may replace the fold lines described above.

Figure 10A:
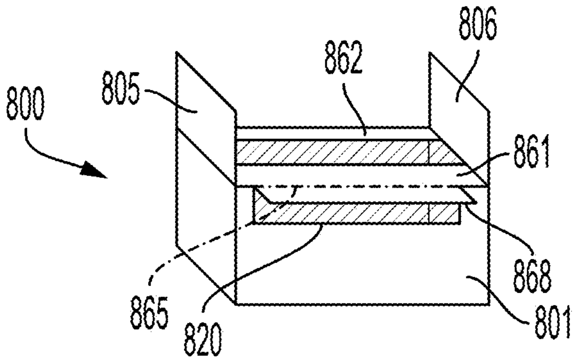
Figure 10B:
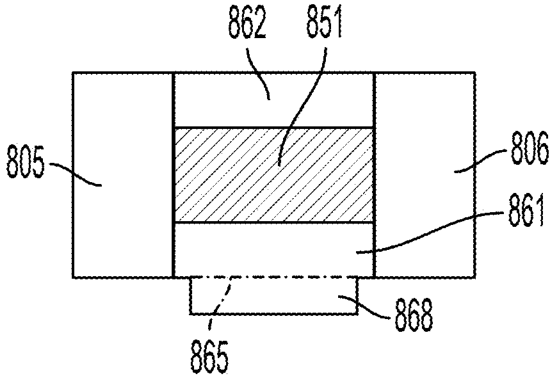
FIG. 10B is a top-down view of this embodiment.
Figure 10C:
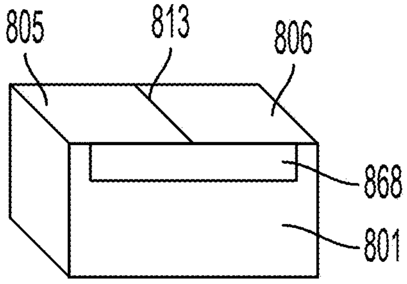
FIG. 10C shows this embodiment in which all flaps are closed.

FIGS. 3-5, 7 and 8 illustrate embodiments in which the top facet includes two facet segments 305, 306. However, as noted above, in some embodiments the top facet may be made up of more than two facet segments. In addition, in some embodiments, the opening via which documents are received may be positioned as high on the side as possible, with the top border of the opening meeting and corresponding to the top of the container. FIG. 10A is a perspective view, and FIG. 10B is a top-down view, of an example embodiment of a container 800 in which this configuration may exist. The opening 820 leading to chamber 851 is positioned at the top of front facet 801 and is formed by three cut lines in the front facet 801 and the top of the front facet 801. Optionally, the front facet 801 may be formed of a single piece with a first top flap 861, meeting at fold line 865. Alternatively, the front facet 801 may be separated from the top flap 861 (see front facet 1301 and top facet 1362 in FIG. 14 for an example showing this alternate structure), and the side flap 868 will extend from first top flap 861 at fold line 865. The side flap 868 can be moved about the fold line between two positions. When the first top flap is folded down as shown in FIG. 10A, the side flap 868 will extend horizontally and reveal opening 820. FIGS. 10A and 10B show the container with the side flap 868 in an open position which exposes opening 820, while FIG. 10C shows the container 800 in a closed position in which side flap 868 is folded down to align with the opening 820 on front flap 801 to cover the opening 820. The side flap 868 may have the same dimensions as opening 820 as shown in FIG. 8C.

Figure 12:
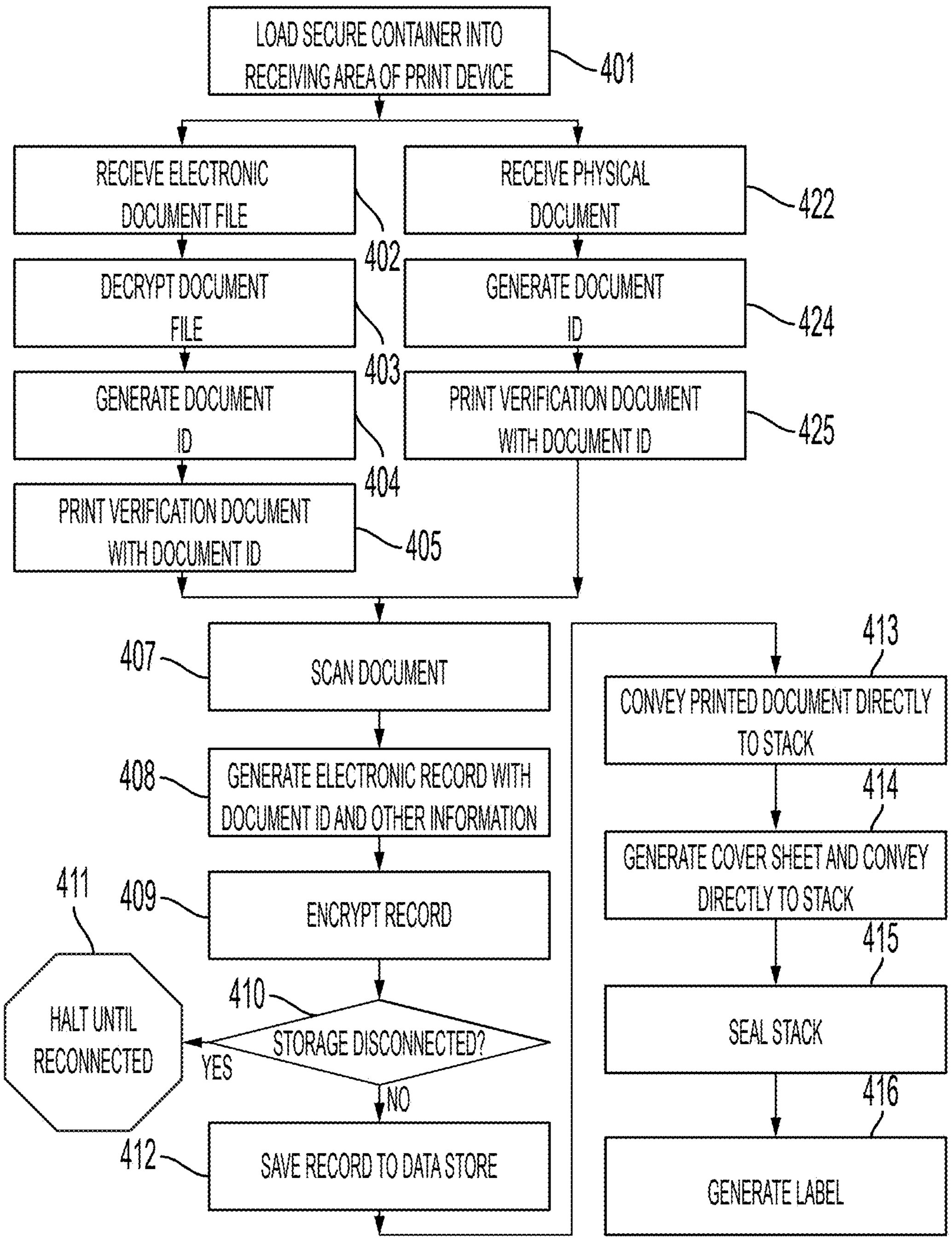
FIG. 12 illustrates example steps of a method of printing documents and securing the printed documents in a container.

Alternatively, the side flap may be have a width dimension that is larger than a width dimension of the opening, a height dimension that is larger than a height dimension of the opening, or both, so that the edges of side flap contact and may be sealed against the front facet 801 when in a closed position (see side flap 1368 and opening 1320 in FIG. 12). In either case, the cut lines around the side flap may then be sealed over and/or against to the front facet 801 using tamper evident tape or other sealing material as described in other embodiments.

The container 800 also may include a second top flap 862 that is integral with the rear side of the container. In some embodiments, when folded closed, as shown in FIG. 10C the front top flap 861 and second top flap 862 may meet at a seam and thus together provide the top facet. Alternatively, as shown in FIGS. 10A-10C, the front top flap 861 and second top flap 862 may be inner flaps, and the other two sides of the container may include integral top facet halves 805, 806 that may be folded down to meet at a seam 813 over the inner flaps.

Figure 11:
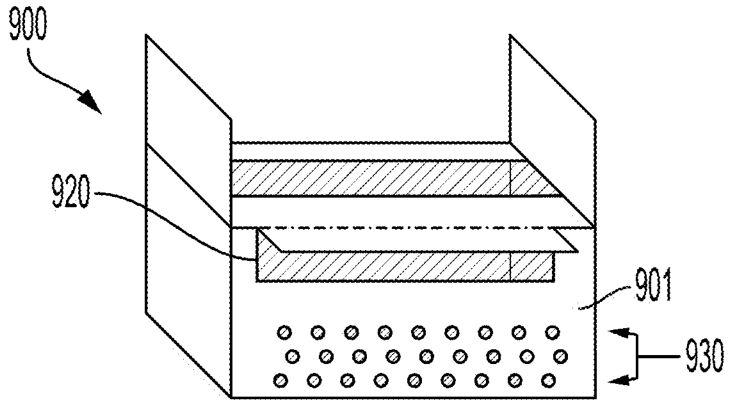
FIG. 11 illustrates an embodiment in which the container includes air holes to promote settling of documents within the container.

FIG. 11 illustrates an embodiment in which one of the side facets includes a matrix of small air holes 930 that help provide an exhaust path for air to escape when documents are placed in opening 920, thus helping to promote even settling of the documents within the container. In use, a vacuum device may be positioned over the exhaust holes 930 to suction air from the container and further promote settling of the documents in the chamber. The air holes 930 will be positioned below the opening 920, at least near the bottom of the container 900, and may be formed in any pattern or shape. The air holes 930 may be positioned in the front facet 901 as shown, or they may be positioned in any other side facet. When the container 900 is sealed closed, the air holes may be sealed with tamper-evident tape or other material. Or, if the air holes 930 are too small to allow documents to be accessed via the air holes, they may be allowed to remain open and unsealed. FIG. 11 illustrates the air holes in a container corresponding to the embodiment of FIGS. 10A-10C, but the air holes also may be used in any of the other embodiments, including but not limited to those shown in FIGS. 3-5, 7 and 8. The air holes 930 may be positioned in the front facet 901 as shown, or they may be positioned in any other side facet. When the container 900 is sealed closed, the air holes may be sealed with tamper-evident tape or other material. Or, if the air holes 930 are too small to allow documents to be accessed via the air holes, they may be allowed to remain open and unsealed. In addition, the container 900 may include any other features described in this document for other embodiments, such as guide markings positioned to guide the placement of tamper-evident tape or other sealing material, and other features.

FIG. 12 describes a process for generating verification copies of ballots, test papers or other documents and securing the verification copies in a secure container using a system such as that described in FIGS. 1 and 2, and optionally with containers such as those described in FIGS. 3-11. In optional step 401, the method may include loading a secure container into a receiving area of a system that includes a print device. The loading will position the container to directly receive documents printed by the print device, such as inside the housing of finishing module 104 of FIG. 1. The secure container will include facets that are connected together to form a chamber. One of the facets of the container may be a front facet that has an opening that is sized with a width that equals or exceeds a width of documents that will be received into the chamber via the opening. The opening will be positioned between a top edge of the front facet and above a midpoint of the front facet. Thus, the container may be a secure container such as that described earlier in this document. Alternatively, the container may simply have an opening that is formed when its top facets are opened, and the system may deliver documents into the top of the container when its top facets are opened. As yet another option, the receiving area may simply include a tray for receiving the stack of documents, and after the stack is formed the system or a human operator may bind the stack with a binding material such as plastic wrap and/or tape.

The print device will print documents to be secured in the container or bound in the stack. The printed documents will be based on source documents that are either electronic document files or physical documents that the system receives. Electronic document files may be received in the form of images, in portable document file (pdf) format, or another format that can secure the integrity of the content of the document. If the system receives a source document in the form of an electronic document file (step 402) such as a file that contains one or more digital ballots or one or more sets of test answers, then at 404 the processor will generate a unique document ID for the source document, and at 405 (a) the processor will generate a print job, and (b) the print device's print engine will execute the print job to print a verification document sheet on a substrate. In embodiments in which the source document is a ballot, the document ID will be independent of any voter ID and will not be generated or stored in any way that associates the source document with the voter who cast the ballot. The verification document sheet will include the content of the electronic document file and the document ID for the source document. If the electronic file is encrypted, at 403 the processor will decrypt the document file upon receipt so that the print device may access the file's contents.

Optionally, before generating the print job, the system may validate the electronic document file received in step 402 using any number of validation methods, such as: (a) verifying that the document file does not include a number of source documents that exceeds the capacity of the available storage container; (b) examining the source document information to ensure that the document information matches expected information (such as an election name, date and/or polling location), (c) ensuring that each source document has an expected number of pages and/or fillable fields; (d) generating a hash of the source document file and/or source documents included in the file and assessing whether the hash matches an expected result. If the system cannot validate the electronic document file, it will not perform the operations described below, and it may generate an alert to require operator inspection.

Optionally, the system may receive document files at 402 in real-time as they are generated, such as directly from a voting machine via a communication network. (In this document, the term "real time" includes an action that happens within a very short period of time after a vote occurs, such as within a limited number of seconds or minutes, including both immediate action and near-real-time action.) Alternatively, the system may receive document files in one or more batches after various documents in a group of documents are created. For example, the system may receive a group of ballots, test sheets, or other documents in a single print job file that contains information for printing multiple of the individual documents. The print job file also may include information for printing a summary sheet that contains auditing information about the individual documents, such as a slip sheet (as will be described in step 414) below.

If the source document is a physical document (step 422) such as a printed ballot or a test paper, then at 424 the processor will generate a document ID for the document, and at 425 the print device will print a verification document sheet that is a copy the source document with the document ID and/or other content that the system may use to verify the printed document in the future.

In either case, the document ID generated at 404 or 424 may be taken from the electronic document file, or the processor may generate a new ID based on information in the electronic document file, based on a time of receipt and/or printing, or based on other information.

At 408 the processor will generate an electronic record that includes the document ID and other information relating to the verification document sheet, and at 412 the processor will save the document ID and other information to a data store. Such information may include, for example: (i) a unique ID for the stack or container in which the verification document sheet will be stored; (ii) a date and/or time at which the document file was received or the verification document sheet printed; (iii) a date and/or time at which the source document or source document file was generated; (iv) a batch ID for a subset of verification document sheets in the stack; (v) a ballot card ID for each document that is a ballot; (vi) an identifier for the person who is the content creator of the source document, such as a voter ID for a ballot, or a student ID or applicant ID for a test; and/or (vii) an image of the verification document.

The system may save each verification document sheet's record in separate data files, or it may bundle a group of verification document sheet records in a single data file, such as by generating a single data file with records for all verification document sheets that are stored in a single stack or container. The data store to which the system stores the file or files may be that of the print device, that of an external server, or both. The data store may be external to the system, and if so the system may transmit the files to the external data store for storage, without keeping any copy of the files on the system that printed the documents and generated the files. As noted above, in some embodiments the external data store may be limited to a single destination, such as the server of a voting location or test-taking location, or a server that is physically connected to the system via a hard wired communication system.

Optionally, before saving or transmitting the record to the data store at 412, the system may compress the record. Optionally, before saving or transmitting the record to the data store at 412, the system may encrypt the record at 409 so that the saved record is encrypted using at least a threshold level or type of encryption such as symmetric encryption, asymmetric encryption, encryption following the Advanced Encryption Standard (AES), Triple Data Encryption Standard (Triple DES or TDES), the RSA algorithm, Twofish, or other algorithms, any of all of which may use 128-bit, 192-bit, 256-bit or other bit size keys. The system may encrypt each record individually, or it may store multiple records and collectively encrypt a data set (such as a database) containing a group of the records.

After printing each verification document, at 413 the system may directly convey the verification document sheets from the print device into the stack, without any human touching the document sheets during the transfer, such as to form a stack of the verification document sheets within the chamber of the container. In other embodiments, the system may convey the verification document sheets to an output tray of the system, from which a human operator or robotic device may remove the verification documents and place them into the container and/or bind the stack. At 415, the stack and/or the opening of the container will be sealed with a secure sealing material, such as tamper-evident tape, plastic wrap or other sealing materials described above. As the system sends the verification documents to the stack and/or container, the system may count the documents and stop the verification document printing process when the count reaches a maximum capacity of the stack or container.

Optionally, before conveying the verification document sheets to the container, a document scanner (such as one contained within additional processing module 132) will receive verification document sheets that the print engine prints and capture an electronic image of each verification document sheet, thus scanning the verification document sheet at 407. The system will save each scanned image to a data store and optionally use the images as described below.

Optionally, after conveying some or all of the verification document sheets for the particular ballots, test results or other source documents that are to be delivered to the stack but before the stack is sealed, the system may generate a slip sheet and convey the slip sheet directly to the container through the container's opening, or otherwise onto the stack, at 414. The slip sheet may be a slip sheet positioned on top all documents in the stack, or various slip sheets may be placed in various positions of the stack. Optionally, the slip sheet may be printed on a substrate of a different size, material and/or color than the substrate of the verification documents. Each slip sheet may include a content summary of the verification document sheets in the stack that are under the slip sheet, such as: (a) a list or range of document IDs of the documents; (b) the time range within which the verification document sheets in the stack were printed; (c) a time at which the final verification document sheet or slip sheet was printed; (d) thumbnails of the captured images of each verification document sheet in the stack; (e) a location at, machine on, and/or time at which the voter, student, applicant or other person who completed the source document did so; (f) the unique ID of the stack and/or the container; (g) a barcode or uniform reference locator that encodes or contains a web address at which any of the information items described here may be retrieved; (h) a barcode that contains content of the source document in encoded form; (i) one or more security markings; (j) a serial number or other ID of the MFD; and/or (k) other information about the source documents or the corresponding verification document sheets in the stack.

Also optionally, after conveying all of the verification documents for the ballots, test results or other documents that are to be delivered to the stack and either before or after the stack or container is sealed, at 416 the system may generate a label containing any or all of the information described above in this paragraph, or other information. The label may be printed on a substrate of a different type as that of the verification document sheets, such as a label substrate for which one side of the substrate includes an adhesive for attaching the label to the container. The label substrate may be a lined substrate in which a backing covers the adhesive until the label will be applied to the container, or to a sealing material around the stack. Alternatively, the label substrate may be a linerless label substrate such as those that are known to those of skill in the art. Optionally, the system may add an RFID tag in the label, or the system may use a label with an embedded RFID. The RFID may be pre-coded with a unique ID that the system may record and store in association with the stack or container ID, or the system may encode the RFID tag with the stack ID, container ID and/or any of the other information listed above.

At any point in the process, if a paper jam, toner cartridge error (i.e., a CRUM error), container filling error, container sealing error or other error occurs such that the verification documents are not properly delivered into and secured in the secure container, the system may generate an alert for an attendant to inspect the system. The system also may automatically unlock the finishing module and/or other access panels of the system to allow for system inspection and container removal. Optionally, after the inspection is complete and the issue is resolved, the system may require the operator to discard or archive the container and printed documents within it, and the system will restart the process by re-printing the first verification document that was generated for the stack, along with all subsequent verification documents and slip sheets for that stack, and delivering those documents to a new stack.

In the method, each of the verification document sheets may correspond to a unique ballot cast by a unique voter, a unique test answer sheet containing answers from a student or applicant in response to a test, or any other unique source document for which secure storage and/or verification of authenticity are desirable.

Optionally, printing the unique IDs on each verification document sheet (as well as on the slip sheet and the container label) may include printing the unique IDs in one or more of the following forms: (a) a document security marking that is not visible to the unaided human eye but which can be detected by an imaging device; (b) a correlation mark; (c) microtext; (d) with ink or toner, such as ultraviolet ink or toner; (e) as an infrared (IR) void pantograph mark; (f) as a fluorescent void pantograph mark; and/or (g) with magnetic ink for magnetic ink character recognition (MICR). Examples of such marks and forms are disclosed in, for example U.S. Pat. Nos. 8,807,442; 9,282,215; 9,456,123; 9,736,330; 9,864,906; 10,237,442; 10,452,964; 10,462,326 and 11,321,441, the disclosures each of which are fully incorporated into this document by reference. When printing the IDs, the system may position the unique ID or IDs on the verification document sheet in a location of the document that does not overlap or otherwise interfere with printed content from the source document, such as voter ballot selections or test answers. For example, the system may define a margin area along one or more edges of the document, and the system may position the unique IDs only in the margin area.

Optionally, when printing the verification document sheets at 405 or 424, the print device may print content of more than one source document on a single sheet. For example, the print device may apply a two pages-per-sheet setting, a four pages-per-sheet setting, or any number of pages per sheet in order to increase efficient printing and storage. In addition, the print device may apply either one-sided printing or two-sided (duplex) printing to each sheet. Optionally, some source documents may require multiple verification document sheets to hold all content of the source document.

In some embodiments, the substrates on which the verification document sheets are printed may be received in sheet form such as 8½×11 inch sheets, 8½×14 inch sheets, A4-sized sheets, or sheets of other sizes. Alternatively, the substrates may be provided in the form of a continuous roll of substrate, and if so the roll of substrate may be spooled through the MFD in steps 405 or 424, 407, 413 and 414. If the substrate is received in roll form, then the system may print the verification document sheets in sequence on the substrate as the substrate spools thorough the print device. Optionally, a finishing module (such as finishing module 104 of FIG. 1) may include a folding device such as a buckle folder, a knife folder and/or a pneumatic folding machine as such devices are known in the art. Alternatively, the finishing module may include a cutter such as a moving blade. If the finishing module includes a folding device, the folding device will apply a crease between each printed verification document sheet so that when the document sheets are delivered into the container at 414, the document sheets will form a stack in a continuously folded accordion format. If the finishing device includes a cutting device, the cutting device will form cut lines between each printed verification document sheet so that when the verification document sheets are delivered into the container at 414 or otherwise stacked the sheets will form a stack of separate sheets. As yet another option, the finishing device may include a spooler, in which case the spooler will re-spool the printed verification document sheets into a printed roll and deliver the final roll to a sealed container and/or bind the roll with a binding material. If so, the system may record a position for each verification document sheet in the data store in association with that sheet's unique ID so that each verification document sheet can be quickly located when the roll is unspooled later.

When forming a stack, the system may determine the number of verification document sheets that the stack will contain using one or more criteria. For example, the system may print and store only verification document sheets generated from ballots, tests or other source documents that were created on the same day. In addition or alternatively, the system may print and store only verification document sheets generated from source documents that were created at a certain location or on a particular machine. In addition or alternatively, the system may print and store only a number of verification document sheets that will result in the stack of sheets and (if used) the container not exceeding a particular weight limit, such as 23 kg (approximately 50.7 lbs), 35 lbs (approximately 15.9 kg), 40 lbs (approximately 18.1 kg), or 50 lbs (approximately 22.7 kg).

When sealing the opening of the container at 415, the sealing material covering may include a tamper evident tape and/or an RFID tag such as those described above. Additionally, in some embodiments sealing the opening at 415 may include placing a portion of the sealing material over a guide marking that is printed on the front facet near the opening.

Optionally, at any point in the process, if the system detects that the storage device to which the system is saving the electronic records has become disconnected (410: YES), at 411 the system will halt the process by stopping the print engine and/or scanner of the MFD from processing additional verification documents. For example, if the storage device is a removable storage medium attached to the MFD and the device has been removed, the system may halt the process until the removable storage medium is reconnected. Also optionally, before resuming the process, the system may require verification that the reconnected storage medium is the same medium that was disconnected and the contents of the storage medium have not been altered. If the system cannot verify that the reconnected storage medium is the same device and/or its contents have not been altered, the system may require an administrator to provide approval before resuming its process.

In addition, at any point in the process an authorized operator may enter a pause command into the system's user interface 212. Upon receipt of a pause command, the system may halt printing of verification documents and sending data to the data store until the system receives a resume command from the authorized operator via the user interface. Optionally, before halting the process, the system may require the operator to provide additional information that the system requires to verify the pause command. For example, the system may require the operator to enter a reason for the pause command, and the system will only halt operation if the reason is one that the system has stored as a qualifying reason. Example qualifying reasons may include, for example, operator shift change or break time, addition of print device consumables (such as toner or paper), inspection required due to system error or repeated system error, or other reasons. In addition, the system may automatically implement a pause command upon detection of certain conditions, such as a container full condition, a paper jam condition, or a condition requiring addition of consumables such as paper or toner.

Optionally, after the container is filled and sealed, and if all validation steps listed above were completed, the MFD may print a label indicating that the container was successfully filled and sealed. If an error or validation failure occurred at any point in the process, the MFD may print a label indicating that an error occurred and/or the container was unsuccessfully filled and sealed. In either situation, the label may be affixed to the container and/or stack before and/or after the container or stack is removed from the MFD.

Also optionally, the MFD may require an operator to enter a valid credential before the MFD will unlock the finishing module 104 and permit the operator to remove the container or stack from the MFD.

The process above may continue until the system receives an event end signal, or of a threshold period of time passes without receiving any new source electronic document files. Upon completion of either trigger, the MFD may generate a label or slip sheet indicating that the election, test or other event has ended. The label or slip sheet may be placed on or in the last stack or container that the system generates for the event.

In various embodiments, the software and/or firmware that is configured to cause the system to perform the functions described in FIG. 12 will be stored solely in memory of the MFD 200, so that no external systems need to be accessed in order for the functions described above to be completed.

Figure 13:
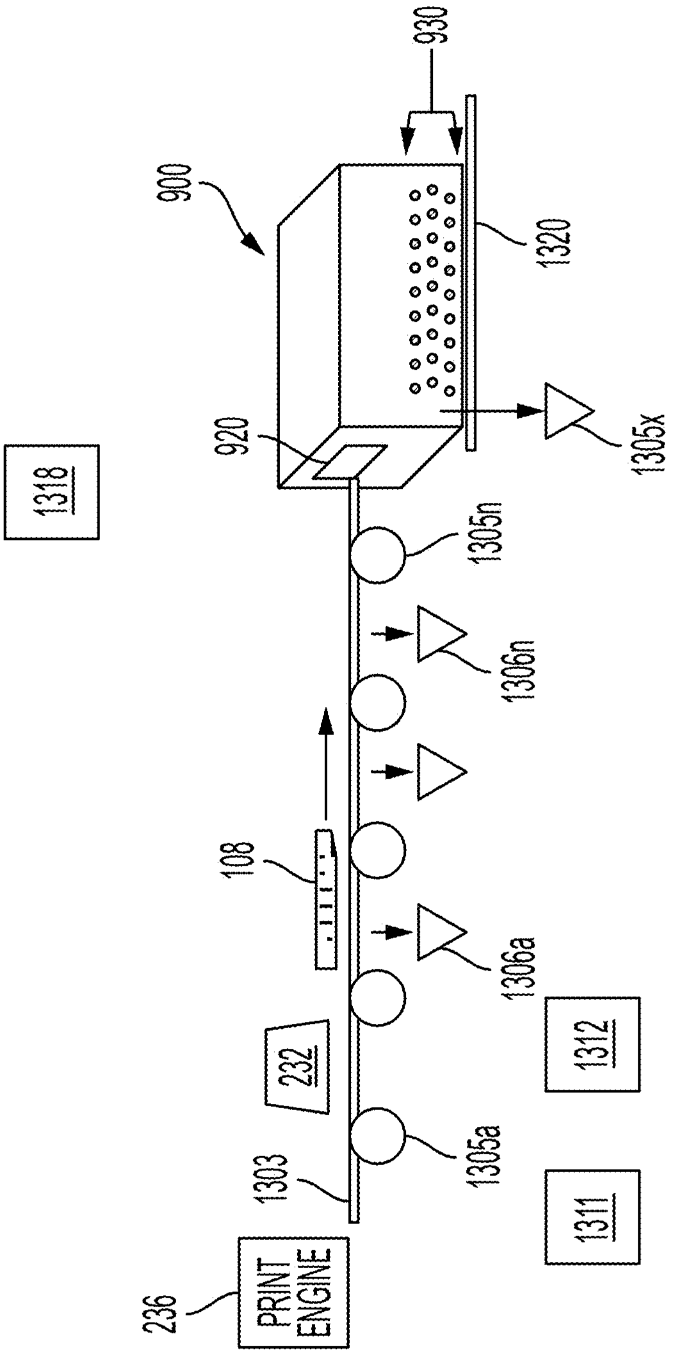
FIG. 13 illustrates example elements of a finishing module that may be used to transport documents into a container, and/or perform other functions (such as scanning) on the documents.

FIG. 13 illustrates example features that may be included in a finishing module of an MFD such as finishing module 104 of FIG. 1, as well as steps of operation by the finishing module. The finishing module of FIG. 13 includes a transport system 1303 configured to deliver documents 108 along a media path from the MFD's print engine 236 to the opening 920 of a stacking tray or secure storage container 900. (This illustration uses a container that is similar to that shown in FIG. 11, except that the exhaust holes 930 are located on a side facet other that is not the front facet of the container. Other embodiments of secure storage containers may be used.) The transport system 1303 includes a belt or other conveyor and/or any number of transport rollers 1305*a* . . . 1305*n* that are operatively connected to a motor 1311. When activated, the motor 1311 causes the transport rollers 1305*a* . . . 1305*n* to turn and move the document 108 toward and onto the tray or into the container 900. Along this transport path, the scanner 232 may capture an image of the document 108 as the document moves past the scanner 232 on the media path. Optionally, the transport system 1303 that is positioned after the print engine 236 and scanner 232 may include a vacuum system including a vacuum device 1312 such as a pump or fan that is fluidly connected to one or more vacuum nozzles 1305*a* . . . 1305*n* that are positioned under the media path to draw air from the path toward the nozzles and help hold the document 108 in a flat position while it moves along the vacuum path. The use of a vacuum system can help keep the document 108 in a suitable position for alignment with the opening 920 of the container so that the document is less likely to miss the opening and/or move and misalign with other documents stacked in the container.

Optionally, instead of using an opening 920 positioned on the side of the container, one or more of the top facets of the container 900 may be opened, and the transport system 1303 may transport documents 108 into the opening that is formed in the top of the container 900 by opening the top facets.

Optionally, as described above in the discussion of FIG. 11, as the documents 108 are delivered into the container, air that is in the container may exhaust from the container via the exhaust holes 930. This can help promote horizontal settling of the documents within the container, without misalignment that could occur if the air were required to move upward and around the document from the bottom of the container. If the container has exhaust holes 930, optionally one or more nozzles 1305*x* of the vacuum system may be positioned to draw air out of the container's chamber via suction through the exhaust holes 930, to further promote settling of the documents within the container.

Optionally, the finishing module may include a moveable shelf 1320 on which the stack or container 900 is positioned and supported. The shelf 1320 may be equipped with drawer glides or other structures that are positioned to align with a track or other support in the finishing module, so that the shelf 1320 may be drawn from an opening in the finishing module.

The finishing module also may include an automatic sealing material applicator 1318 such as a robotic tamper-evident tape applicator, or a robotic plastic wrapping system. Suitable systems for automatic placement of tape are known; any suitable now or hereafter known robotic container packing system may be used. Alternatively, the box may be removed from the device via the shelf, and the sealing material may be applied by a human while the human's actions are recorded by a camera (such as camera 120 of FIG. 1). Either way, if the box includes security tape guide markings, then the tamper-evident tape or other sealing material will be placed over and aligned with the guide markings as described above.

Figure 14:
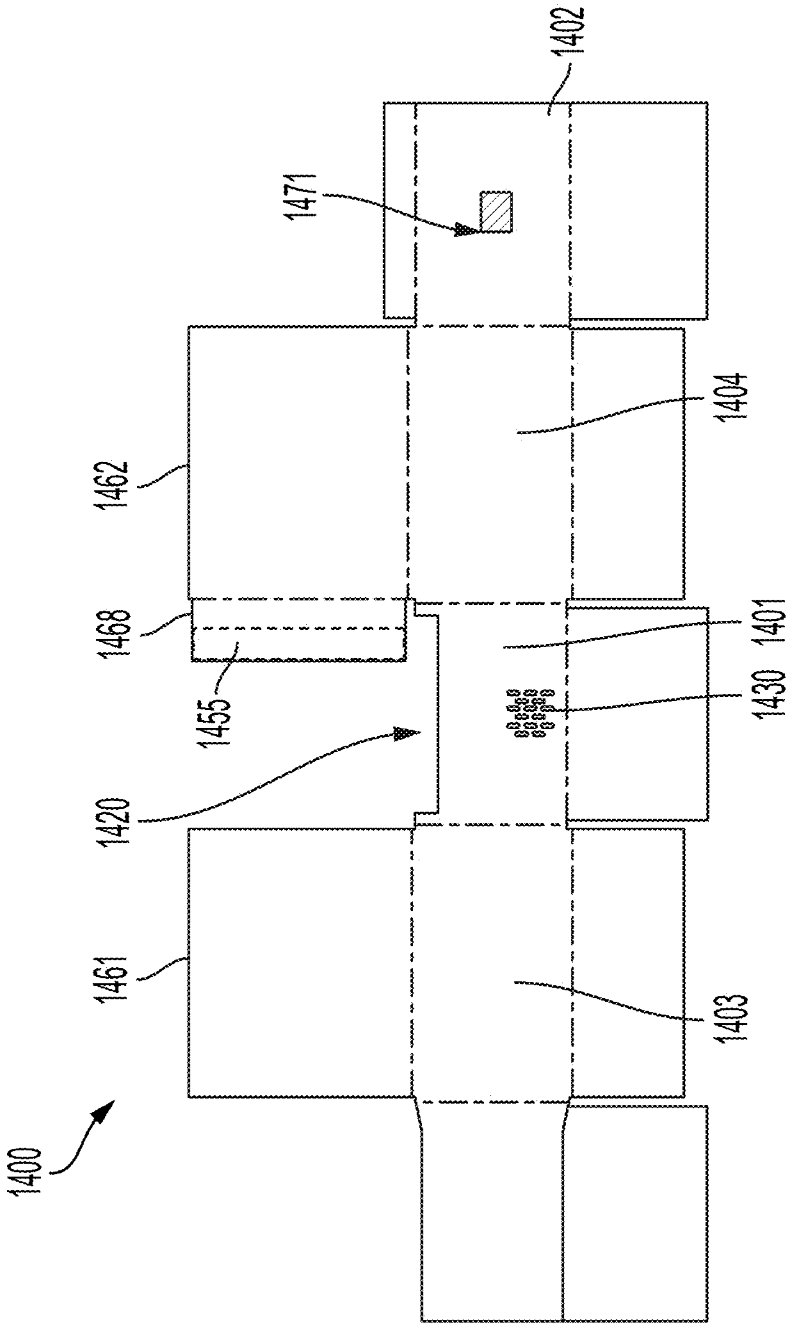
FIG. 14 illustrates an example package flat that may be provided to form a container in various embodiments.

FIG. 14 illustrates an example package flat 1400 that may be provided to form the container of various embodiments. The package flat 1400 is a flat substrate made of cardboard or other material, and in which the facets are formed by cut lines and fold lines. Cut lines are lines formed by cutting the substrate and are illustrated by solid lines in FIG. 14. Fold lines are creases formed by compressing the substrate and are illustrated by dashed lines in FIG. 14. In FIG. 14, front facet 1401 appears in a central area of the package flat and includes exhaust holes 1430 cut into the substrate material. The container's opening 1420 for receiving documents is formed by cut lines at the top of front facet 1401. The cut lines and the top edge of front facet 1401 serve as the boundaries of the opening 1420. Side facets 1403 and 1404 are foldably attached to front facet 1401 in that each side facet is attached to the front facet via a fold line. First top facet 1461 is foldably attached to a first side facet 1403, and second top facet 1462 is foldably attached to a second side facet 1404. In this embodiment, rather than forming a seam in the center of the top of the box when closed (as in seam

813 of FIG. 10C, when closed top facet segment 1462 will substantially completely cover top facet segment 1461, or vice versa, so that the seams are formed around the edges of the overlapping top facet segments. Also, in some embodiments, top facet segment 1461 may be omitted, so that the top facet is formed only from a single top facet segment 1462.

A side flap 1468 is foldably attached to and extends from the second top facet 1462. When the package flat is folded to form a container, the side flap 1468 will be foldably positioned to move between a first position that covers the opening 1420 and a second position that exposes the opening 1420 so that the opening can accept documents. (See similar elements side flap 868 and opening 820 in FIG. 10A, although in the embodiment of FIG. 14 the side flap 1468 has a width and/or height that is larger than that of the opening 1420.) Optionally, a sealing material 1455 such as double sided tape may be attached to the underside of side flap 1468 to aid in adhering and sealing the side flap 1468 to the front facet 1401 to cover the opening 1420 when the container is filled and sealed.

FIG. 14 also shows that one of the facets includes a label or tag 1471 attached to the facet. The label or tag 1471 may be an RFID tag, an adhesive label, an adhesive label with an RFID tag attached to or embedded within it, or the like. Items that include RFID tags, such as customer replaceable units (CRUs) as are known to be used in print devices, may be employed in some embodiments, so long as the CRUs or their associated RFID chips include a unique identifier that cannot be modified when deployed. In FIG. 14 the label or tag 1471 is attached to rear facet 1402, but in other embodiments label or tag 1471 could be attached to any other facet. In addition, in various embodiments the label or tag 1471 could be attached to an exterior of a facet, attached to an interior of a facet, or attached to a facet by being embedded within it.

The following paragraphs provide more information about certain terms used in this document.

In this document, the term "multi-function device" (or "MFD") refers to a machine comprising hardware and associated software configured to enable the device to print documents on substrates, as well as perform at least one other function such as copying, facsimile transmitting or receiving, image scanning, or performing other actions on document-based data.

The term "print device" refers to a machine having hardware capable of reading digital data and using the information from the data and associated print instructions to print a physical document on a substrate. In some embodiments, a print device may have additional capabilities such as scanning or faxing, and thus in some embodiments a print also may be a multi-function device. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate.

The term "print engine" refers to the marking hardware of a print device, such as a print head, along with marking material storage and delivery components such as a print cartridge containing ink, toner or another marking material. A print engine also includes conveyors, rollers or other media transport components that are configured to move a substrate past the print head to receive printed images onto the substrate. In an inkjet printing system, the marking material storage and delivery components may include one or more print heads arranged in a print zone that eject ink drops onto the substrate. In a laser printer, the marking material storage and delivery components may include toner, a laser, and related components configured to transfer the toner onto the substrate.

The term "print job" refers to digital data embodied in a set of instructions and/or parameters that can guide operation of a print engine to print content on a substrate.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include voting machines in various applications of this disclosure. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A "computer program product" is a memory device with programming instructions stored on it.

An "imaging device" refers to any device capable of optically viewing an object and converting an interpretation of that object into electronic signals. One such example of an imaging device is a camera. Another example is the image sensing hardware of an electronic device that is used to capture images, such as a document scanner.

The features and functions described above, as well as alternatives, may be combined into many other different systems or applications. Various alternatives, modifications, variations or improvements may be made by those skilled in the art, each of which is also intended to be encompassed by the disclosed embodiments.

Without excluding further possible embodiments, certain example embodiments are summarized in the following clauses:

Clause 1: A method, comprising: (i) providing a container comprising a plurality of facets that are connected together to form a chamber, wherein one of the facets is a front facet with an opening that is sized with a width that equals or exceeds a width of each of a plurality of document sheets that will be received into the chamber via the opening. The opening is positioned at or below a top edge of the front facet and above a midpoint of the front facet. A print device will printing the plurality of document sheets, each of which includes a unique identifier (ID). The print device will directly convey the document sheets into the chamber from the print device, without any human touching the document sheets, to form a stack of the document sheets within the chamber. The opening will then be sealed with a sealing material.

Clause 2: The method of clause 1, wherein: each of the document sheets corresponds to one or more unique ballots cast by a unique voter; or each of the document sheets corresponds to a set of test answers provided by a unique person who completed a test.

Clause 3: The method of clause 1, wherein: (a) each of the document sheets corresponds to one or more unique ballots; and (b) each unique ID comprises or is derived from one or more of the following for each of the unique ballots: (i) a time at which a voter cast the ballot, or (ii) a location or machine at which the voter cast the ballot.

Clause 4: The method of any of clauses 1-3, further comprising (a) printing a slip sheet comprising a content summary that includes the unique IDs or a range of the unique IDs, and (b) directing the slip sheet into the chamber via the opening.

Clause 5: The method of clause 4, further comprising capturing a digital image of each document sheet before the document sheet is conveyed to the container, wherein the content summary comprises thumbnails of each of the digital images.

Clause 6: The method of clause 4 or 5, wherein the content summary includes one or more of the following: (a) a time range within which the document sheets in the container were printed; (b) a time at which a final document sheet in the container was printed; (c) a time at which the slip sheet was printed; (d) a unique ID of the container; or (e) a barcode or uniform reference locator that encodes or contains a web address at which any of the items listed above.

Clause 7: The method of any of clauses 1-6, wherein each unique ID comprises or is derived from one or more of the following: (a) a unique ID for the print device; (b) a unique ID for the container; (c) a date and/or time at which the document sheet was printed; (d) a date and/or time at which a source document was generated or received; (e) a batch ID for a subset of document sheets in the container; (f) a unique ballot card identifier for each document sheet that is a ballot; or (g) an identifier for a person who provided content contained in the document sheet.

Clause 8: The method of any of clauses 1-7, further comprising, for each of the document sheets, by the print device after printing the document sheet and before directing the document sheet the opening, scanning a digital image of the document sheet.

Clause 9: The method of any of clauses 1-8, further comprising printing a slip sheet that includes (a) a code that encodes an address at which the digital images of each of the document sheets are stored, or the digital images of each of the document sheets. In this clause, the method also comprises, after directing the document sheets into the chamber, directing the slip sheet into the chamber via the opening to position the slip sheet on top of the stack.

Clause 10: The method of any of clauses 1-9, wherein printing the document sheets comprises printing content of more than one source document on at least some of the document sheets.

Clause 11: The method of any of clauses 1-10, wherein the security covering comprises a tamper evident tape and/or an RFID tag, and sealing the opening comprises placing a portion of the security covering over a security marking that is printed on the front facet near the opening.

Clause 12: The method of any of clauses 1-11, wherein printing each of the document sheets comprises printing the unique ID on each document sheet on an area that does not interfere with content from a source document.

Clause 13: The method of any of clauses 1-12, further comprising printing a plurality of security elements on each of the document sheets.

Clause 14: The method of any of clauses 1-13, further comprising using a camera to record the printing, directing and sealing steps to a video file.

Clause 15: The method of any of clauses 1-14, further comprising, before sealing the opening with the security covering, attaching a unique code to the security covering by printing the unique code on the security covering, or by embedding an RFID tag with the unique code in the security covering.

Clause 16: A system, comprising (a) a container comprising a plurality of facets that are connected together to form a chamber, wherein one of the facets is a front facet with an opening that is sized with a width that equals or exceeds a width of each of a plurality of document sheets that will be received into the chamber via the opening, and that is positioned at or below a top edge of the front facet and above a midpoint of the front facet; and (b) a print device comprising a processor and programming instructions that are configured to, when executed by the print device, cause the print device to implement a method according to any of clauses 1-15.

Clause 17: The system of clause 16, further comprising additional programming instructions that are configured to cause the processor to implement a method according to any of clauses 2-15.

Clause 19: A print device comprising: (a) a print engine comprising one or more print heads; (b) a finishing module comprising a housing that is configured to hold a container at a position where an opening of the container is positioned to receive documents directly from a transport mechanism; (c) a processor; and (c) a memory containing programming instructions that are configured to cause the processor to cause the print engine to print a plurality of document sheets, each of which includes a unique identifier (ID); and (d) directly convey the document sheets from the print engine through the opening of the container and into a chamber of the container, without any human touching the document sheets, to form a stack of the document sheets within the chamber.

Clause 20: The print device of clause 16, further comprising additional programming instructions that are configured to cause the processor to implement a method according to any of clauses 2-15.

The invention claimed is:

1. A method, comprising:

providing a container comprising a plurality of facets that are connected together to form a chamber, wherein one of the facets is a front facet with an opening that is:

sized with a width that equals or exceeds a width of each of a plurality of document sheets that will be received into the chamber via the opening, and positioned at or below a top edge of the front facet and above a midpoint of the front facet;

by a print device, printing the plurality of document sheets, each of which includes a unique identifier (ID);

printing a slip sheet comprising a content summary that includes the unique IDs or a range of the unique IDs;

by a finishing module of the print device:

directly conveying the document sheets and the slip sheet into the chamber from the print device via the opening, without any human touching the document sheets, to form a stack of the document sheets within the chamber, and directing the slip sheet into the chamber via the opening; and sealing the opening with a sealing material.

2. The method of claim 1, wherein:

each of the document sheets corresponds to one or more unique ballots cast by a unique voter; or each of the document sheets corresponds to a set of test answers provided by a unique person who completed a test.

3. The method of claim 1, wherein:

each of the document sheets corresponds to one or more unique ballots; and each unique ID comprises or is derived from one or more of the following for each of the unique ballots:

a time at which a voter cast the ballot, or a location or machine at which the voter cast the ballot.

4. The method of claim 1, further comprising:

by an imaging device, capturing a digital image of each document sheet before the document sheet is conveyed to the container, wherein the content summary comprises thumbnails of each of the digital images.

5. The method of claim 1, wherein the content summary includes one or more of the following:

a time range within which the document sheets in the container were printed;

a time at which a final document sheet in the container was printed;

a time at which the slip sheet was printed;

a unique ID of the container; or a barcode or uniform reference locator that encodes or contains a web address at which any of the items listed above may be retrieved.

6. The method of claim 1, wherein each unique ID comprises or is derived from one or more of the following:

a unique ID for the print device;

a unique ID for the container;

a date and/or time at which the document sheet was printed;

a date and/or time at which a source document was generated or received;

a batch ID for a subset of document sheets in the container;

a unique ballot card identifier for each document sheet that is a ballot; or an identifier for a person who provided content contained in the document sheet.

7. The method of claim 1, further comprising, for each of the document sheets:

by the print device after printing the document sheet and before directing the document sheet to the opening, scanning a digital image of the document sheet.

8. The method of claim 7, wherein the slip sheet further includes:

a code that encodes an address at which the digital images of each of the document sheets are stored, or the digital images of each of the document sheets.

9. The method of claim 1, wherein printing the document sheets comprises printing content of more than one source document on at least some of the document sheets.

10. The method of claim 1, wherein:

the sealing material comprises a tamper evident tape; and sealing the opening comprises placing a portion of the sealing material over a security marking that is printed on the front facet near the opening.

11. The method of claim 1, wherein printing each of the document sheets comprises printing the unique ID on each document sheet on an area that does not interfere with content from a source document.

12. The method of claim 1, further comprising printing a plurality of security elements on each of the document sheets.

13. The method of claim 1, further comprising using a camera to record the printing, directing and sealing steps to a video file.

14. The method of claim 1 further comprising, before sealing the opening with the sealing material attaching a unique code to the sealing material by printing the unique code on the sealing material.

15. A system, comprising:

a container comprising a plurality of facets that are connected together to form a chamber, wherein one of the facets is a front facet with an opening that is:

sized with a width that equals or exceeds a width of each of a plurality of document sheets that will be received into the chamber via the opening, and positioned at or below a top edge of the front facet and above a midpoint of the front facet; and a print device comprising a processor and programming instructions that are configured to, when executed by the print device, cause the print device to:

print the plurality of document sheets, each of which includes a unique identifier (ID), print a slip sheet comprising a content summary that includes the unique IDs or a range of the unique IDs, directly convey the document sheets into the chamber from the print device via the opening, without any human touching the document sheets, to form a stack of the document sheets within the chamber, direct the slip sheet into the chamber via the opening, and seal the opening with a sealing material.

16. A method, comprising providing a container comprising a plurality of facets that are connected together to form a chamber, wherein one of the facets is a front facet with an opening that is:

sized with a width that equals or exceeds a width of each of a plurality of document sheets that will be received into the chamber via the opening, and positioned at or below a top edge of the front facet and above a midpoint of the front facet;

by a print device, printing the plurality of document sheets, each of which includes a unique identifier (ID);

by a finishing module, directly conveying the document sheets into the chamber from the print device via the opening, without any human touching the document sheets, to form a stack of the document sheets within the chamber; and sealing the opening with a sealing material, wherein:

the sealing material comprises a tamper evident tape, and sealing the opening comprises placing a portion of the sealing material over a security marking that is printed on the front facet near the opening.

17. The method of claim 16, further comprising using a camera to record the printing, conveying and sealing steps to a video file.

18. The method of claim 16, wherein:

each of the document sheets corresponds to one or more unique ballots cast by a unique voter; or each of the document sheets corresponds to a set of test answers provided by a unique student or applicant.

19. A method, comprising:

providing a container comprising a plurality of facets that are connected together to form a chamber, wherein one of the facets is a front facet with an opening that is:

sized with a width that equals or exceeds a width of each of a plurality of document sheets that will be received into the chamber via the opening, and positioned at or below a top edge of the front facet and above a midpoint of the front facet;

by a print device, printing the plurality of document sheets, each of which includes a unique identifier (ID);

by a finishing module, directly conveying the document sheets into the chamber from the print device via the opening, without any human touching the document sheets, to form a stack of the document sheets within the chamber;

attaching a unique code to a sealing material by printing the unique code on the sealing material; and after printing the unique code on the sealing material, sealing the opening with the sealing material.

20. The method of claim 19, further comprising using a camera to record the printing, conveying and sealing steps to a video file.

21. The method of claim 19, wherein:

each of the document sheets corresponds to one or more unique ballots cast by a unique voter; or each of the document sheets corresponds to a set of test answers provided by a unique student or applicant.

* * * * *